US008195318B2

(12) United States Patent
Oh et al.

(10) Patent No.: US 8,195,318 B2
(45) Date of Patent: Jun. 5, 2012

(54) METHOD AND AN APPARATUS FOR PROCESSING AN AUDIO SIGNAL

(75) Inventors: Hyen O Oh, Seoul (KR); Yang Won Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 253 days.

(21) Appl. No.: 12/429,634

(22) Filed: Apr. 24, 2009

(65) Prior Publication Data

US 2009/0271015 A1 Oct. 29, 2009

Related U.S. Application Data

(60) Provisional application No. 61/047,430, filed on Apr. 24, 2008, provisional application No. 61/048,229, filed on Apr. 28, 2008.

(30) Foreign Application Priority Data

Apr. 21, 2009 (KR) ........................ 10-2009-0034673

(51) Int. Cl.
*G06F 17/00* (2006.01)
*H04R 5/00* (2006.01)
*G11B 27/00* (2006.01)
*H04N 5/93* (2006.01)

(52) U.S. Cl. ............... 700/94; 381/17; 381/23; 386/285

(58) Field of Classification Search .............. 381/17–23, 381/119; 369/4; 700/94; 386/285, 321, 386/338, 339
See application file for complete search history.

(56) References Cited

U.S. PATENT DOCUMENTS

| | | | | |
|---|---|---|---|---|
| 6,704,421 | B1 | 3/2004 | Kitamura | |
| 2005/0058307 | A1* | 3/2005 | Yang et al. | 381/119 |
| 2006/0122717 | A1 | 6/2006 | Wilson et al. | |
| 2007/0140499 | A1* | 6/2007 | Davis | 381/23 |
| 2007/0280485 | A1* | 12/2007 | Villemoes | 381/22 |
| 2009/0110203 | A1* | 4/2009 | Taleb | 381/17 |

FOREIGN PATENT DOCUMENTS

| | | | |
|---|---|---|---|
| WO | WO-2006/091540 | A2 | 8/2006 |
| WO | WO-2007/083957 | A1 | 7/2007 |
| WO | WO-2007/091870 | A1 | 8/2007 |
| WO | WO-2008/039039 | A1 | 4/2008 |
| WO | WO-2008/039042 | A1 | 4/2008 |

OTHER PUBLICATIONS

"ISO/IEC 14496-1:2002", 2002, ISO/IEC, pp. 58-72, 143-154, 176-179, 209, 236-238.*

* cited by examiner

*Primary Examiner* — Jesse Elbin

(74) *Attorney, Agent, or Firm* — Birch, Stewart, Kolasch & Birch, LLP

(57) ABSTRACT

An apparatus for processing an audio signal and method thereof are disclosed. The preset invention includes receiving object information and a downmix signal including at least one object, the object information comprising data type information and at least one of object gain and object gain ratio; determining whether preset information to render the object is included in the extension region of the object information, based on the data type information; generating initial preset information to render the object by using at least one of the object gain and the object gain ration, if the preset information is not included in the object information; and rendering the object being included the downmix signal by using the initial preset information.

Accordingly, even if preset information is not received, it is able to reconstruct an audio signal by generating initial preset information using received object information.

14 Claims, 13 Drawing Sheets

METHOD AND AN APPARATUS FOR PROCESSING AN AUDIO SIGNAL

CROSS-REFERENCE TO RELATED APPLICATION

This application claims the benefit of U.S. Provisional Application No. 61/047,430, filed on Apr. 24, 2008, U.S. Provisional Application No. 61/048,229, filed on Apr. 28, 2008, KR Application No. P2009-0034673, filed on Apr. 21, 2009, which are hereby incorporated by reference.

BACKGROUND OF THE INVENTION

1. Field of the Invention

The present invention relates to audio signal processing. More preferably, it is suitable for processing an audio signal received via a digital medium, a broadcast signal or the like.

2. Discussion of the Related Art

In a process for generating a downmix signal by downmixing an audio signal including at least one object into a mono or stereo signal, parameters are extracted from the object. Theses parameters are used in decoding the downmixed signal. And, positions and gains of the objects can be controlled by a selection made by a user as well as the parameters.

Objects included in a downmix signal should be controlled by a user's selection. However, when a user controls an object, it is inconvenient for the user to directly control all object signals. And, it may be more difficult to reproduce an optimal state of an audio signal including a plurality of objects than a case that an expert controls objects.

SUMMARY OF THE INVENTION

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which a level and panning of an object can be controlled using preset information being predetermined and preset metadata.

Another object of the present invention is to provide an apparatus for processing an audio signal and method thereof, by which initial preset information can be generated using an object gain an object gain ratio included in object information if preset information for controlling a level and panning of an object is not received.

Another object of the present invention is to provide an apparatus for processing an audio signal and method thereof, by which preset information for adjusting a gain of an object included in a downmix signal or both gain and panning can be provided using an object gain and/or an object gain ratio according to characteristics of a sound source and a use purpose of a user.

Another object of the present invention is to provide an apparatus for processing an audio signal and method thereof, by which preset information can be used by a separate playback device in a manner of extracting and storing preset information generated using an object gain and an object gain ratio separately from a sound source.

A further object of the present invention is to provide an apparatus for processing an audio signal and method thereof, by which an object included in a downmix signal can be adjusted by applying preset information and preset metadata to all data regions of the downmix signal or one data region of the downmix signal according to a characteristic of a sound source.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal according to the present invention includes receiving object information and a downmix signal including at least one object, the object information comprising: data type information indicating a type of data being included in an extension region of the object information and at least one of object gain indicating gain applied to the object being included the downmix signal and object gain ratio indicating a gain difference of the object contributing to at least two channels of the downmix signal; determining whether preset information to render the object is included in the extension region of the object information, based on the data type information; generating initial preset information to render the object by using at least one of the object gain and the object gain ration, if the preset information is not included in the object information; and rendering the object being included the downmix signal by using the initial preset information.

Preferably, the initial preset information is generated by using the object gain, if the downmix signal is mono signal.

Preferably, the initial preset information is generated by using the object gain and the object gain ratio, if the downmix signal is stereo signal. Preferably, the initial preset information comprises first initial preset information adjusting gain of the object and second initial preset information adjusting gain and panning of the object.

Preferably, the initial preset information is generated in each data region of the object information.

More preferably, the rendering the object further uses the object gain and the object gain ratio.

To further achieve these and other advantages and in accordance with the purpose of the present invention, an apparatus of processing an audio signal according to the present invention includes a receiving unit receiving object information and a downmix signal downmixing at least one object, the object information comprising: data type information indicating a type of data being included in an extension region of the object information and at least one of object gain indicating gain applied to the object being included the downmix signal and object gain ratio indicating a gain difference of the object contributing to at least two channels of the downmix signal; a preset information determining unit determining whether preset information to render the object is included in the extension region of the object information, based on the data type information; an initial preset information generating unit generating initial preset information to render the object by using at least one of the object gain and the object gain ratio, if the preset information is not included in the object information; and a rendering unit rendering the object being included the downmix signal by using the initial preset information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings. First of all, terminologies in the present invention can be construed as the following references. And, terminologies not disclosed in this specification can be construed as the following meanings and concepts matching the technical idea of the present invention. Therefore, the configuration implemented in the embodiment and drawings of this disclosure is just one most preferred embodiment of the present invention and fails to represent all technical ideas of the present invention. Thus, it is understood that various modifications/variations and equivalents can exist to replace them at the timing point of filing this application.

In this disclosure, 'information' is the terminology that generally includes values, parameters, coefficients, elements and the like and its meaning can be construed as different occasionally, by which the present invention is non-limited.

Figure 1:
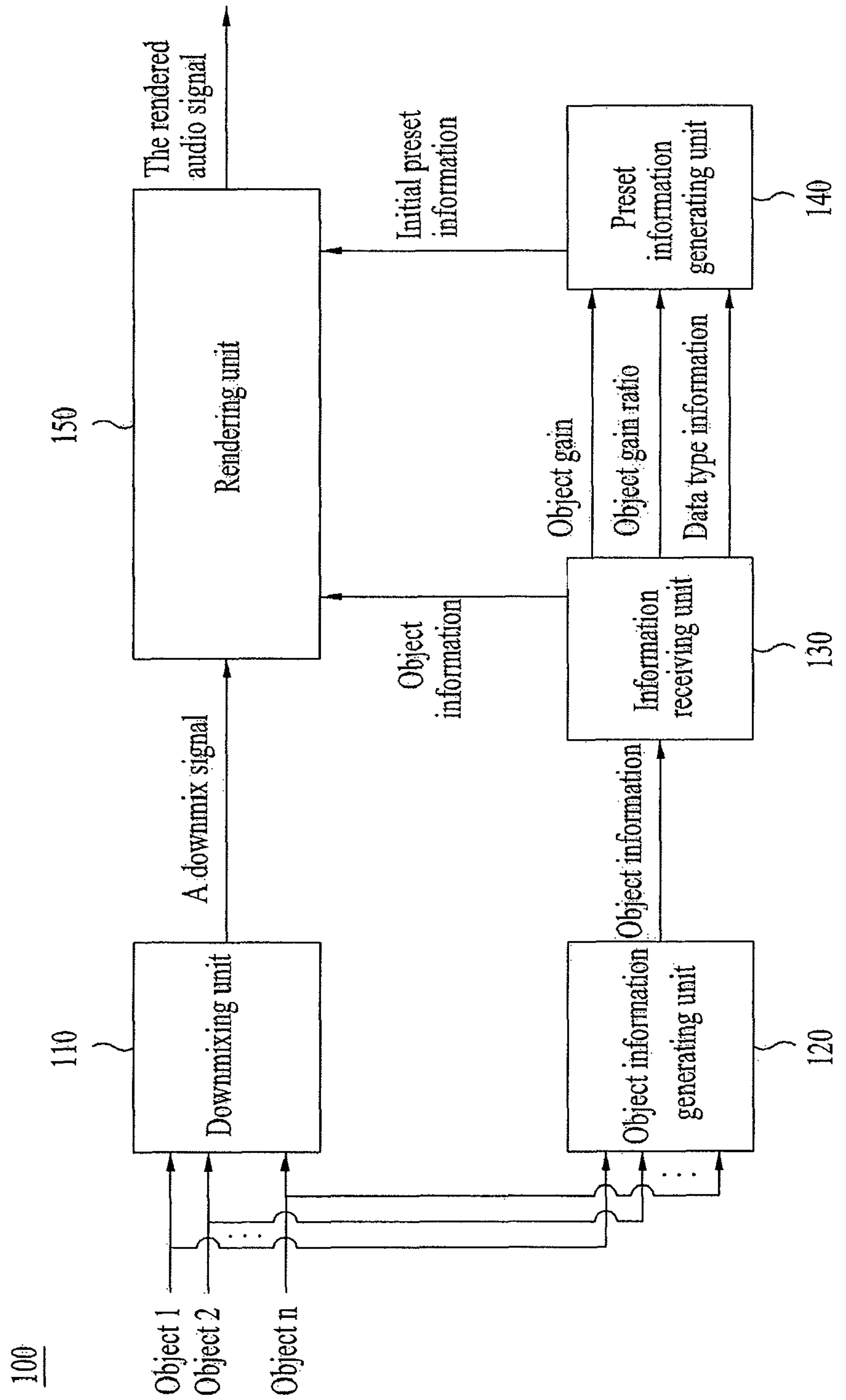
FIG. 1 is a block diagram of an audio signal processing apparatus including a preset information generating unit generating preset information using object information according to one embodiment of the present invention.

FIG. 1 is a block diagram of an audio signal processing apparatus 100 including a preset information generating unit generating preset information using object information according to one embodiment of the present invention. In this disclosure, a set of information previously set to adjust an object is named a preset mode. The preset mode includes preset metadata and preset information. The preset information is able to indicate various user-selectable modes according to a characteristic of an audio signal or a listening environment. And, at least one preset mode can exist. In particular, it is able to adjust a level of an output channel in a manner of having an object included in a channel different from a previous channel in which the object has existed in encoding (hereinafter called 'panning') or adjusting a gain of an object, when the object is outputted.

Referring to FIG. 1, an audio signal processing apparatus 100 according to one embodiment of the present invention mainly includes a downmixing unit 110, an object information generating unit 120, an information receiving unit 130, a preset information generating unit 140 and a rendering unit 150.

A plurality of objects is inputted to the downmixing unit 110 to generate a mono or stereo downmix signal. Moreover, a plurality of the objects is inputted to the object information generating unit 120 to generate object information indicating an attribute of the object. The object information may include object level information indicating a level of the object, object gain indicating a gain value applied to the object being included the downmix signal and object gain ratio indicating a gain difference of the object contributing to at least two channels of the downmix signal, respectively. Moreover, the object information further comprises object correlation information indicating a presence or non-presence of inter-object correlation.

The information generating unit 120 is able to generate data type information (data_type_information) indicating a data type included in an extension region of the object information. The detailed meanings of the data type information are shown in Table 1. The object gain, object gain ratio and data type information generated by the information generating unit 120 can be transferred by being included in one bitstream, and more particularly, in an ancillary region of the bitstream including a downmix signal.

TABLE 1

| Data type information (data_type_information) | meaning |
|---|---|
| 0 | Preset information is not included. |
| 1 | Preset information is included. |

The information receiving unit 130 receives the bitstream including the object gain, the object gain ratio and the data type information and then outputs the object gain, the object gain ratio and the data type information to the preset information generating unit 140 and the rendering unit 150.

Meanwhile, the preset information generating unit 140 receives the data type information and at least one of the object gain and the object gain ratio. And, it is able to generate initial preset information using the data type information and at least one of the object gain and object gain ratio, which will be explained in detail with reference to FIG. 2 and FIG. 3.

The rendering unit 150 receives a downmix signal including at least one object, the object information outputted from the information receiving unit 130 and the preset information outputted from the preset information generating unit 140. In this case, the preset information is applied to the object included in the downmix signal to adjust a level of the object or an output channel contributing the object.

Moreover, if the audio signal processing apparatus 100 includes a display unit (not shown in the drawing), a rendered level of an audio signal and a feature of the generated preset information and the like can be displayed on a screen.

Thus, since the preset information generating unit 140 is included in a decoding apparatus, even if preset information is not received from an encoder, the audio signal processing apparatus 100 according to the present invention generates and uses preset information as rendering data. Therefore, the audio signal processing apparatus 100 is able to adjust an audio signal (preferably, object) according to a characteristic of a sound source or a user's purpose of use.

Figure 2:
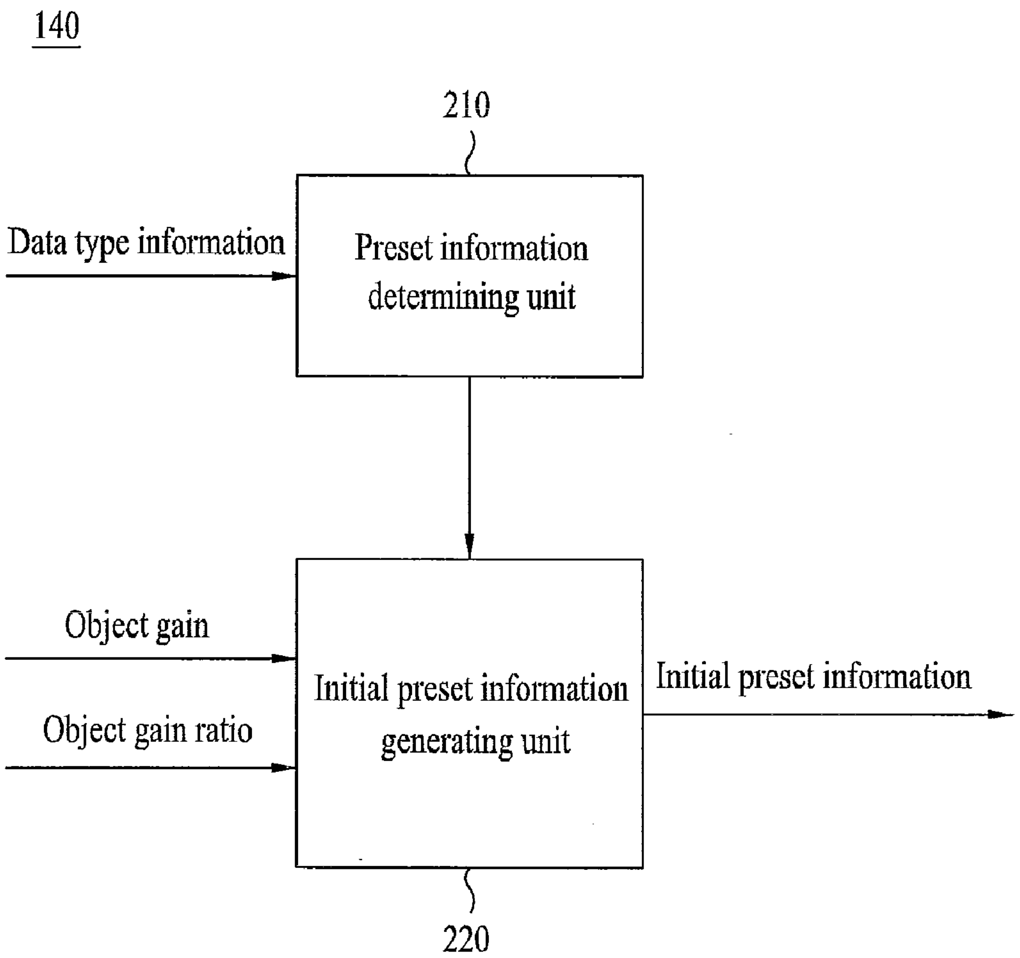
FIG. 2 is a block diagram of the preset information generating unit shown in FIG. 1.

FIG. 2 is a block diagram of the preset information generating unit 140 shown in FIG. 1.

Referring to FIG. 2, the preset information generating unit 140 includes a preset information determining unit 210 and an initial preset information generating unit 220.

First of all, the preset information determining unit 210 receives data type information and then determines whether preset information is included in a bitstream, based on the data type information. If the data type information is set to 1, as shown in Table 1, i.e., the preset information is included in the bitstream, the preset information is extracted from the bitstream and is then applied to a downmix signal. This will be explained in detail with reference to FIGS. 8A to 10B.

On the contrary, if the data type information is set to 0, as shown in Table 1, i.e., the preset information is not included in the bitstream, preset information has to generate because it is necessary to decode an audio signal. For this, the initial preset information generating unit 220 receives at least one of object gain and object gain ratio and is then able to generate initial preset information using at least one of the object gain and the object gain ratio. This method of generating the initial preset information from the initial preset information generating unit 220 will be explained with reference to FIG. 3 as follows.

Figure 3:
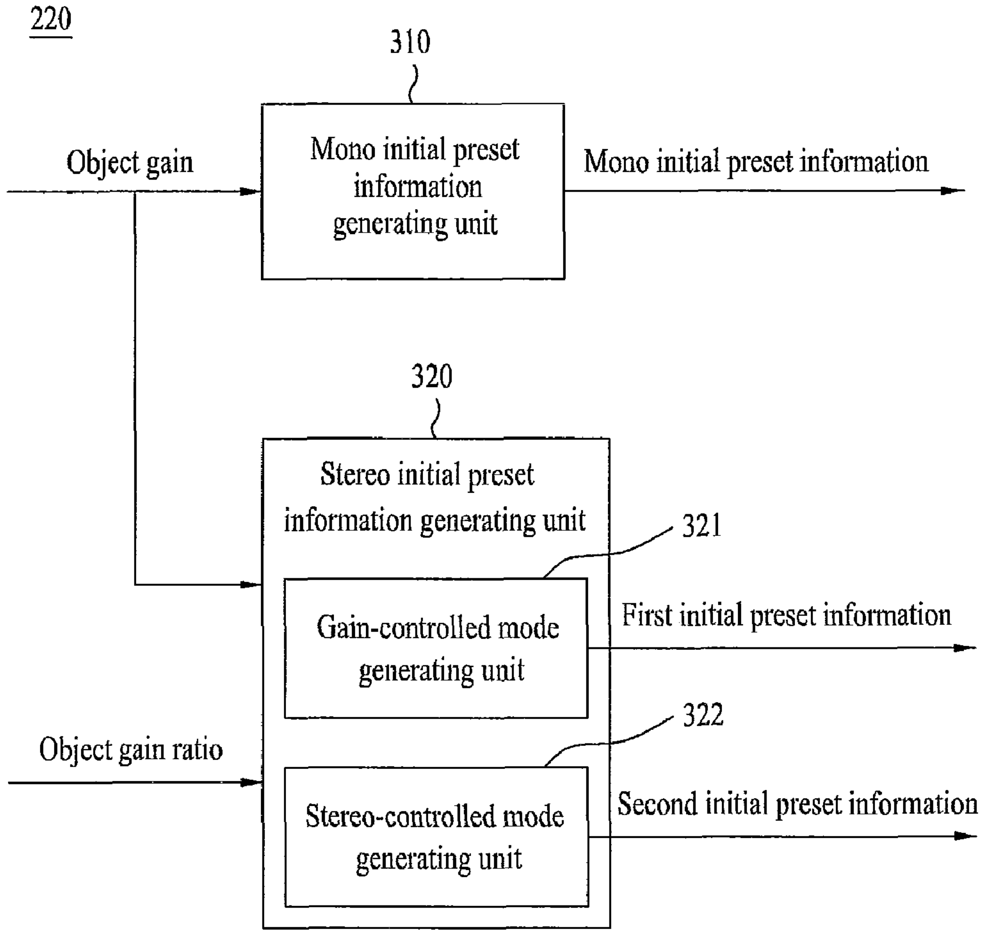
FIG. 3 is a block diagram of an initial preset information generating unit shown in FIG. 2.

FIG. 3 is a block diagram of the initial preset information generating unit 220 shown in FIG. 2.

Referring to FIG. 3, the initial preset information generating unit 220 mainly includes a mono initial preset information generating unit 310 and a stereo initial preset information generating unit 320.

Whether the mono initial preset information generating unit 310 or the stereo initial preset information generating unit 320 generates initial preset information is determined by a channel of a downmix signal. In case that a downmix signal is a mono signal, the mono initial preset information generating unit 310 is activated. In this case, the mono initial preset information generating unit 310 receives an object gain and is then able to generate mono initial preset information. Preferably, the mono initial preset information uses the object gain as an element of a center channel of a rendering matrix and is able to set elements of the rest channels to 0.

In case that a downmix signal is a stereo signal, the stereo initial preset information generating unit 320 is activated and is then able to generate initial preset information using an object gain ratio as well as an object gain. The stereo initial preset information generating unit 320 includes a gain adjustment mode generating unit 321 and a stereo adjustment mode generating unit 322.

The stereo adjustment mode generating unit 322 is able to generate second initial preset information for adjusting a gain of an object and adjusting a position of an object to enable to object to exist in another channel. Preferably, if the object signal exists one of channels of the downmix signal, the second initial preset information adjusts a position of the object to enable the object to exist on another channel as well (hereinafter named 'panning').

The second initial preset mode can be represented as a matrix generated using object gain and object gain ratio. In this case, the matrix can have the form shown in Formula 1. And, the respective elements of the matrix can be calculated using Formula 2 and Formula 3.

$$M_{stereo} = \begin{bmatrix} m_{0,Lf} & \cdots & m_{N-1,Lf} \\ m_{o,Rf} & \cdots & m_{N-1,Rf} \end{bmatrix} \quad \text{[Formula 1]}$$

$$m_{k,Lf} = 10^{0.05G_{k,0}}\sqrt{\frac{10^{0.1G_{k,1}}}{1+10^{0.1G_{k,1}}}} \quad \text{[Formula 2]}$$

$$m_{k,Rf} = 10^{0.05G_{k,0}}\sqrt{\frac{1}{1+10^{0.1G_{k,1}}}}$$

$$G_{k,0} = 10\log_{10}(m_{k,Lf}^2 + m_{k,Rf}^2 + \varepsilon) \quad \text{[Formula 3]}$$

$$G_{k,1} = 20\log_{10}\left(\frac{m_{k,Lf}}{m_{k,Rf}}\right)$$

Besides, the gain adjustment mode generating unit 321 is able to generate first initial preset information including information for adjusting a gain of object only.

Preferably, the first initial preset information can include a karaoke mode for rendering a level of a vocal object to get close to 0 by applying a small gain value to the vocal object only and an a cappella mode for outputting a vocal object only in a manner of rendering levels of different objects to get closer to 0 by applying a small gain value to the different objects except the vocal object. The vocal object among the objects can be determined using at least one of position information of an object generated in encoding and channel correlation difference information included in object information.

Moreover, the first initial preset information can be represented as a matrix generated using an object gain and an object gain ratio as well. This matrix can have the form shown in Formula 4. And, the respective elements of the matrix can be calculated using Formula 5 and Formula 6.

$$M_{stereo} = \begin{bmatrix} m_{0,Lf} & \cdots & m_{N-1,Lf} \\ m_{o,Rf} & \cdots & m_{N-1,Rf} \end{bmatrix} \quad \text{[Formula 4]}$$

$$m_{k,Lf} = 10^{0.05G_{k,0}}\sqrt{\frac{10^{0.1dmxCLD_k}}{1+10^{0.1dmxCLD_k}}}, \quad \text{[Formula 5]}$$

$$m_{k,Rf} = 10^{0.05G_{k,0}}\sqrt{\frac{1}{1+10^{0.1dmxCLD_k}}}$$

$$G_{k,0} = 10\log_{10}(m_{k,Lf}^2 + m_{k,Rf}^2 + \varepsilon) \quad \text{[Formula 6]}$$

The first initial preset information or the second initial preset information generated by the gain adjustment mode generating unit 321 or the stereo adjustment mode generating unit 322, respectively, is inputted to the rendering unit 150 shown in FIG. 1 to be applied to a downmix signal and adjusts an object included in the downmix signal.

Preferably, in case that the initial preset information is the first initial preset information, a gain of object is adjusted only. In case that the initial preset information is the second initial preset information, a gain and panning of object can be adjusted.

Moreover, the initial preset information can be generated in each data region using at least one of object gain and object gain ratio. In this case, the data region is a region of a bitstream including data for an actual audio signal and can include a frame.

Figure 4A:
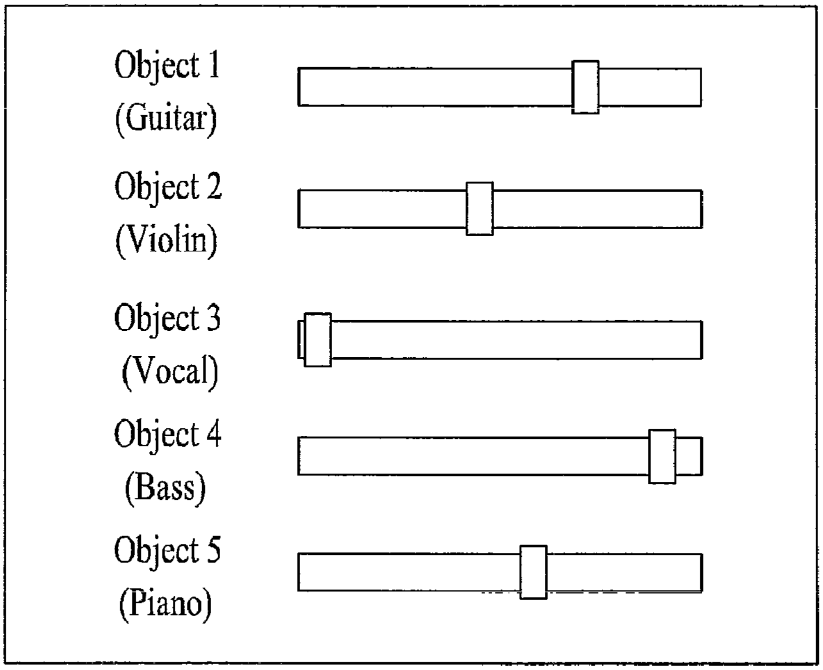
FIG. 4A and FIG. 4B are diagrams of a display unit on which a level of an adjusted object is displayed if a karaoke mode or a cappella mode is selected from preset modes.
Figure 4B:
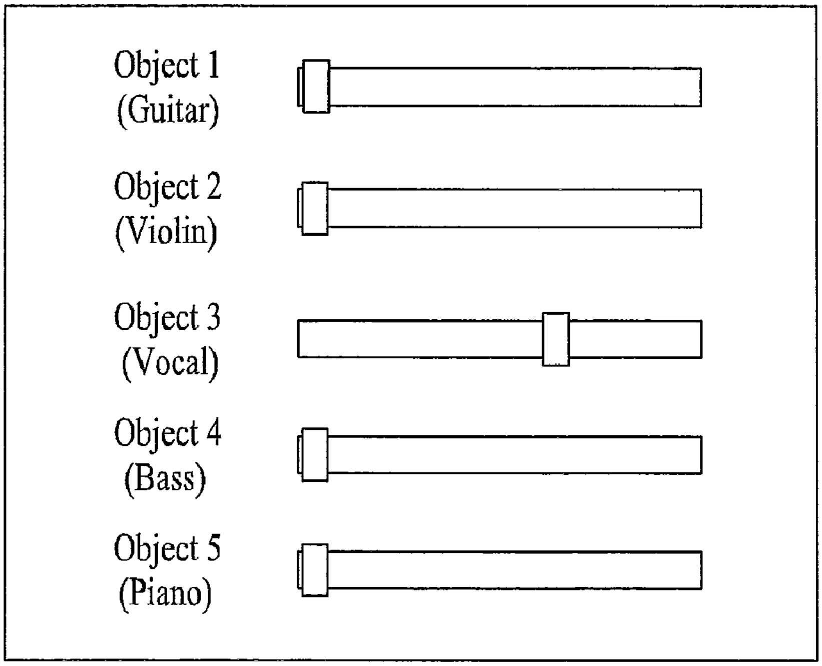

FIG. 4A and FIG. 4B are diagrams of a display unit on which a level of an adjusted object is displayed if a karaoke mode or a cappella mode is selected from preset modes.

Referring to FIG. 4A and FIG. 4B, a level of an object adjusted by initial preset information can be displayed on a display unit together with metadata indicating a feature of the object.

In case that initial preset information is a karaoke mode among gain adjustment initial preset information, as shown in FIG. 4A, it is able to reduce a size of a vocal object among objects included in an output signal using the initial preset information. This is displayed on a screen to enable a user to recognize that the karaoke mode has been activated.

In case that initial preset information is an a-cappella mode, as shown in FIG. 4B, it is able to reduce levels of other objects except the vocal object among objects included in an output signal using the initial preset information. This is displayed on a screen to enable a user to recognize that the a-cappella mode has been activated.

The preset metadata is text type information indicating what the object is. In this case, the preset metadata can indicate a generated date of preset information, a writer, a name of a preset mode and the like, by which the preset metadata is non-limited.

Figure 5:
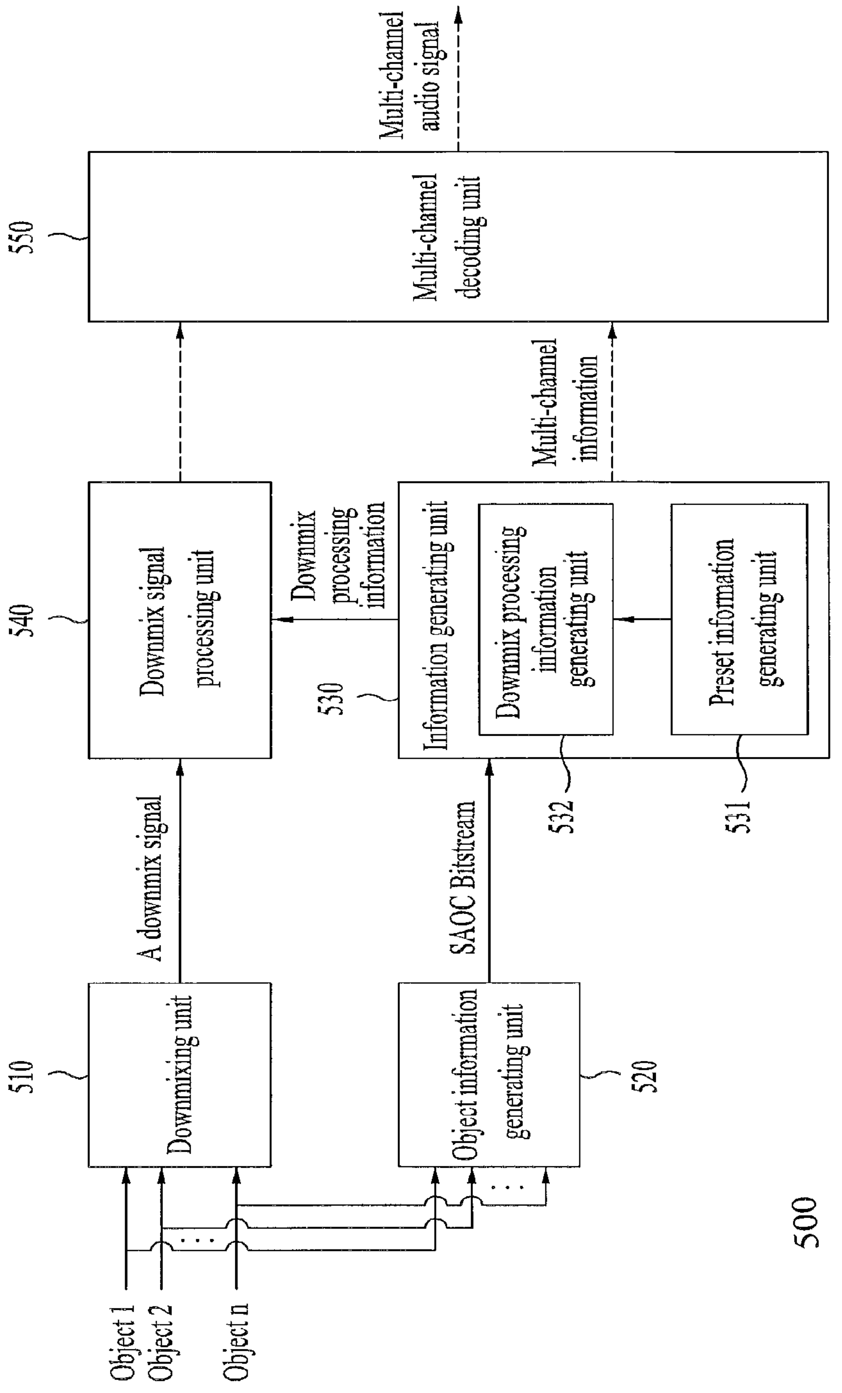
FIG. 5 is a block diagram of an audio signal processing apparatus according to another embodiment of the present invention.

FIG. 5 is a block diagram of an audio signal processing apparatus 500 according to another embodiment of the present invention.

Referring to FIG. 5, an audio signal processing apparatus 500 according to another embodiment of the present invention mainly includes a downmixing unit 510, an object information generating unit 520, an information generating unit 530, a downmix signal processing unit 540 and a multi-channel decoding unit 550. Since functions and configurations of the downmixing unit 510 and the object information generating unit 520 is same as those of the former downmixing unit 110 and the former information generating unit 120 shown in FIG. 1, their details are omitted in the following description.

The information generating unit 530 includes a preset information generating unit 531 and a downmix processing information generating unit 532 and receives SAOC bitstream. Whether the preset information generating unit 531 generates preset information is determined based on data type information included in the SAOC bitstream.

If the preset information is determined not to be included in the bitstream based on the data type information, the preset information generating unit 531 generates initial preset information in a decoder using at least one of an object gain and object gain ratio included in the SAOC bitstream and is then able to output the initial preset information.

As mentioned with reference to FIGS. 1 to 3, the preset information generating unit 531 is able to generate initial preset information.

The downmix signal processing information generating unit 532 receives the preset information and the SAOC bitstream and then generates downmix processing information for processing a downmix signal using the preset information and SAOC bitstream.

Subsequently, the downmix processing information is inputted to the downmix signal processing unit 540 and then alters a channel including an object included in the downmix signal to perform the panning.

If the number of output channels of an audio signal is greater than that of channels of a downmix signal, the information generating unit 530 is able to further generate multi-channel information for upmixing a downmix signal using the SAOC bitstream and the preset information. In this case, the multi-channel information is outputted to the multi-channel decoding unit 550. And, the multi-channel decoding unit 550 is able to generate a multi-channel audio signal by receiving the pre-processed downmix signal and the multi-channel information and then performing upmixing.

Thus, in decoding a downmix signal including at least one object into a multi-channel signal, even if preset information is not transmitted, the audio signal processing apparatus according to the present invention is able to generate preset information using object information included in an SAOC bitstream.

Therefore, it is able to adjust a level and/or panning of an object using preset information generated by a decoder. In this case, the initial preset information is generated in each data region to enable an audio signal to be reconstructed closer to an original inputted sound.

Figure 6:
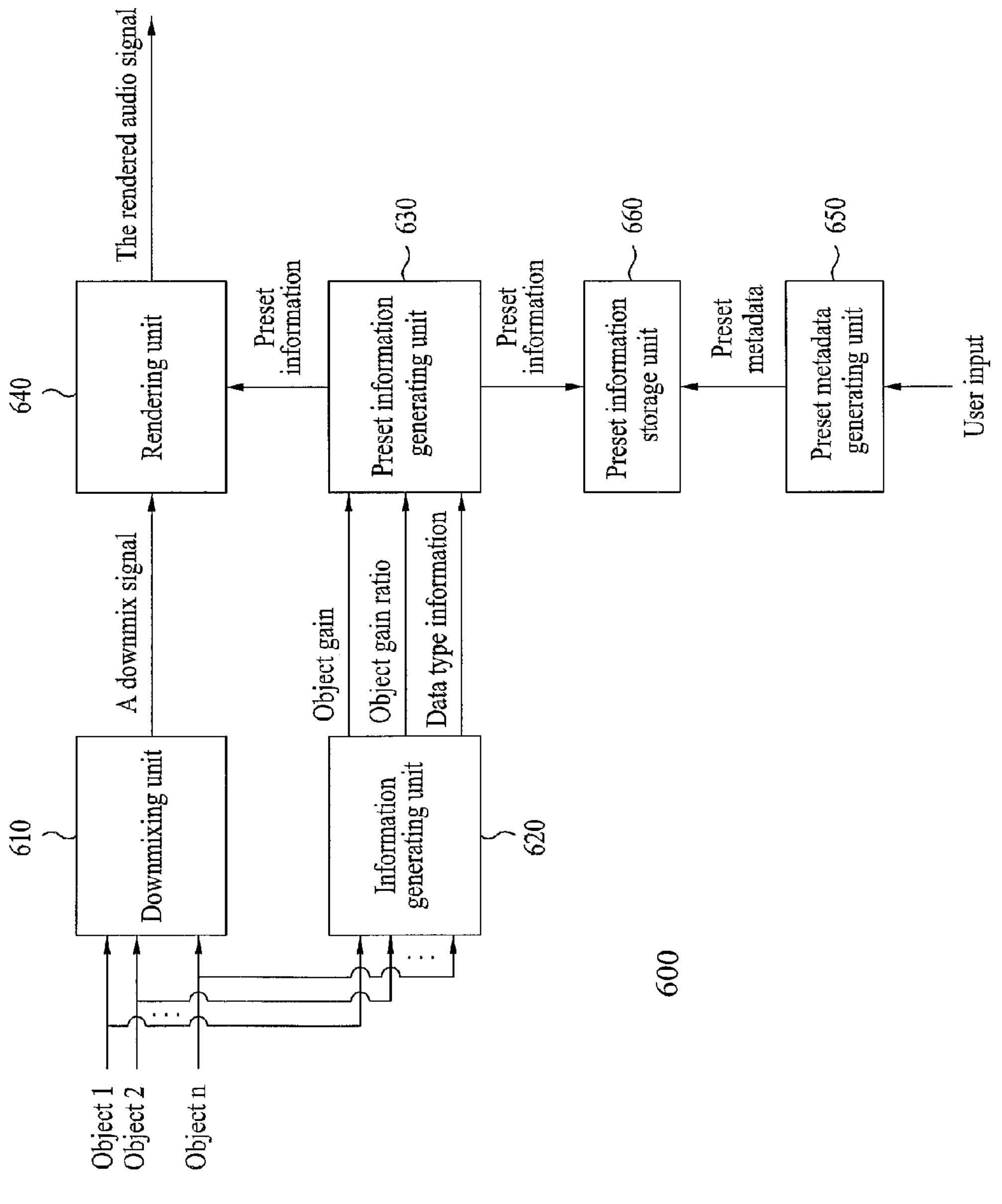
FIG. 6 is a block diagram of an audio signal processing apparatus including a preset information storing unit and a preset metadata generating unit according to a further embodiment of the present invention.

FIG. 6 is a block diagram of an audio signal processing apparatus 600 according to a further embodiment of the present invention. An audio signal processing apparatus and method according to the present invention enable a user to listen to audio signals of various versions according to a user's purpose of use or a playback configuration by rendering a downmix signal using preset information. In this case, it may be illegal to separately extract and store an audio signal to which preset information is applied or use it for another playback apparatus via a non-allowed path. Therefore, an audio signal processing apparatus according to the present invention further includes a preset information storing unit configured to store preset information generated separate from an audio signal.

Referring to FIG. 6, an audio signal processing apparatus 600 according to a further embodiment of the present invention mainly includes a downmixing unit 610, an information generating unit 620, a preset information generating unit 630, a rendering unit 640, a preset metadata generating unit 650 and a preset information storing unit 660. The functions and configurations of the downmixing unit 610, the information generating unit 520 and the rendering unit 640 is same as those of the blocks having the same names in FIG. 5 and their details will be omitted.

Meanwhile, the preset information generating unit 630 has the same function and configuration of the former preset information generating unit 531 shown in FIG. 5 and is able to generate initial preset information. Moreover, in case of receiving preset information for rendering an object included in a downmix signal from the information generating unit 620, the preset information generating unit 630 is able to generate modified preset information using a user input further.

The preset information storing unit 560 is able to store the preset information generated by the preset information generating unit 530. The present information storing unit 560 may have a separate memory or register and is able to further store information of a data region to which the initial preset information or the received preset information is applied, object gain used in generating the initial preset information, object gain ratio used in generating the initial preset information and the like. If the preset information generating unit 630 generates the modified preset information, it is a matter of course that the preset information storing unit 560 is able to store the modified preset information.

The preset metadata generating unit 550 is able to generate preset metadata corresponding to the initial preset information or the modified preset information. The preset metadata can be generated using a signal inputted by a user. And, the signal inputted by the user can be inputted using a user input unit (not shown in the drawing). Moreover, the preset metadata can include a name of the initial preset information or the modified preset information, a writer of the initial preset information or the modified preset information, a written date of the initial preset information or the modified preset information and the like.

Figure 7:
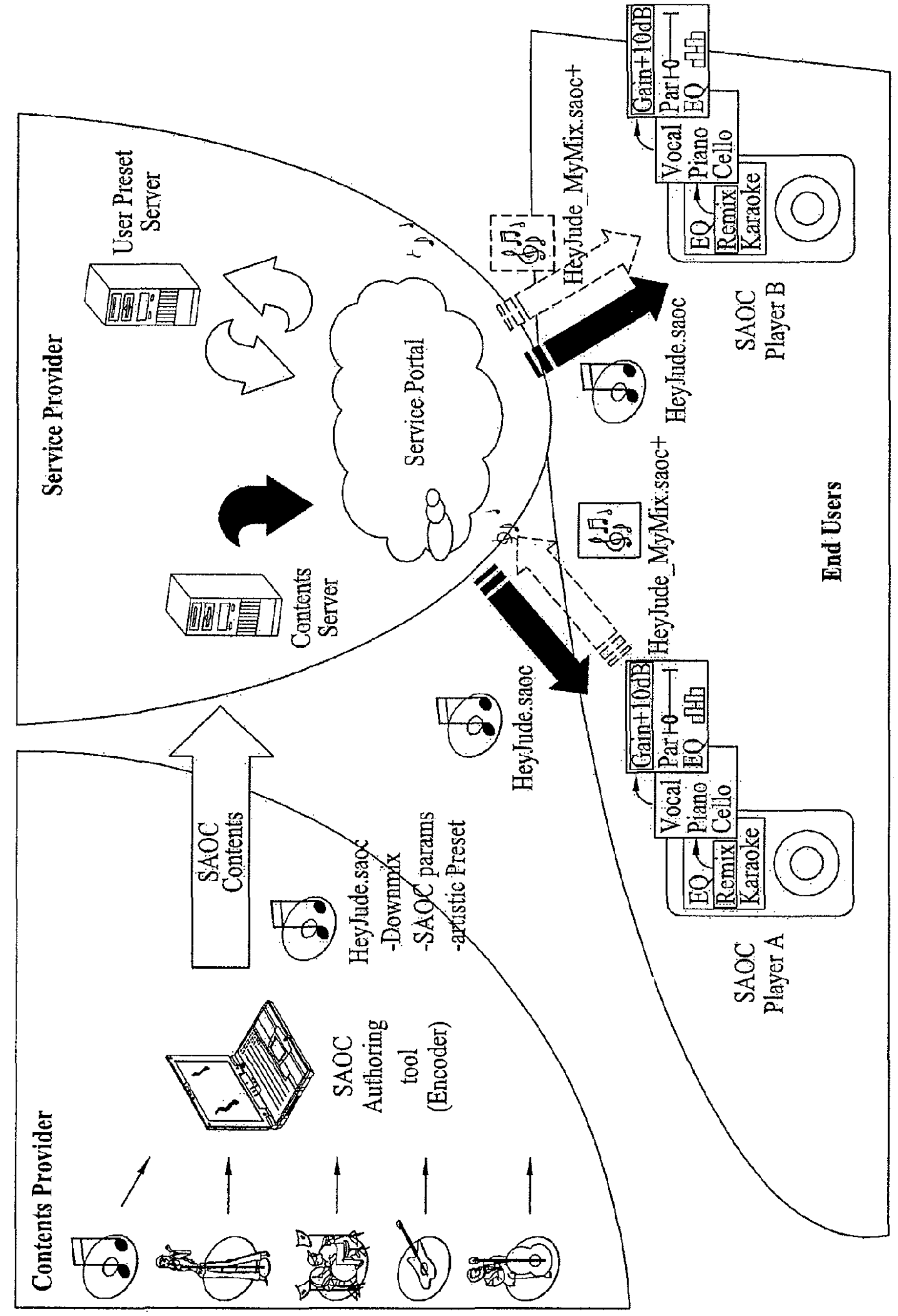
FIG. 7 is a conceptional diagram for an audio signal processing method for storing preset information to use separately.

FIG. 7 is a conceptional diagram for an audio signal processing method for storing, transmitting and using preset information via the audio signal processing apparatus shown in FIG. 6. The preset information comprises the modified preset information and the initial preset information.

Referring to FIG. 7, a bitstream generated by an encoding device using a plurality of objects is named 'HeyJude.saoc'. The 'HeyJude.saoc' includes a downmix signal by downmixing at least one object, object information (SAOC params) indicating an attribute of object, and preset information (artistic Preset) for rendering the downmix signal.

SAOC contents encoded by this method can be provided by a service portal through wire/wireless. The service portal can have a contents server and a user preset server. In this case, the contents server is able to store an encoded downmix signal and object information. And, the user preset server can store preset information. The contents server and the user preset server may be configured in separate units, respectively or can be included in the same unit to operate.

A user is able to receive a downmix signal and object information, which are legally allowed by the service portal in a manner of paying a transmit fee and the like for example. A user is also able to receive preset information from the user preset server. The 'HeyJude.saoc' can be received after paying a transmit fee, as shown in FIG. 7. And, a file (HeyJude_Mymix.saoc+) including preset information and preset metadata generated by an SAOC player A can be transmitted to the service portal Meanwhile, an SAOC player B receives 'HeyJude.saoc' file (for which the transmit fee is paid) and is also able to receive the HeyJude_Mymix.saoc+ file from the service portal. In this case, since the HeyJude_Mymix.saoc+ file is a work separate from the 'HeyJude.saoc' file, the transmission of the HeyJude_Mymix.saoc+ file does not infringe the right of an original copyright proprietor.

Figure 8A:
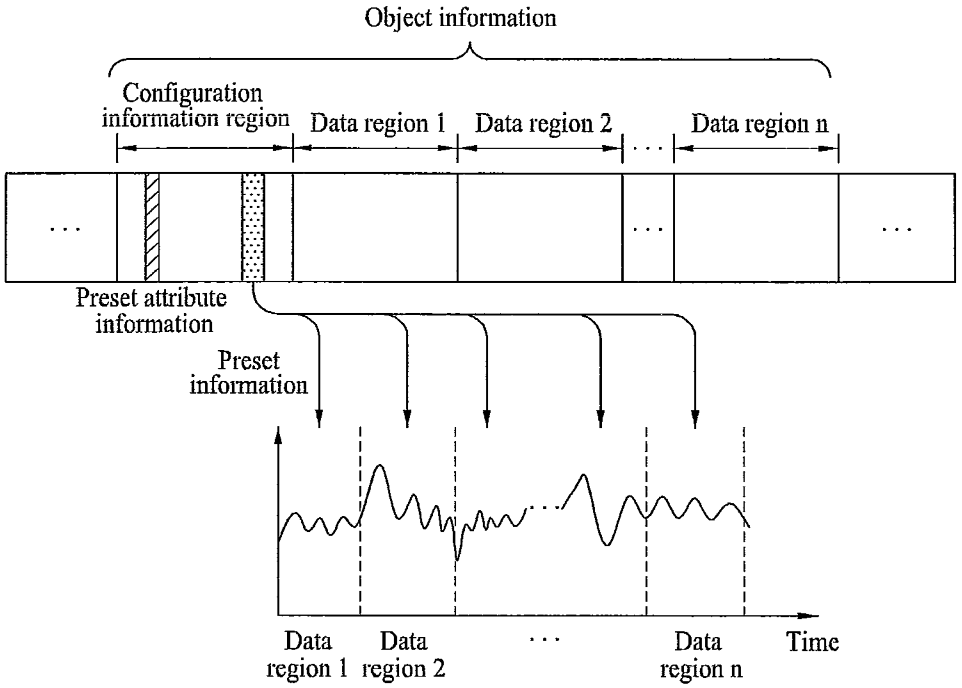
FIG. 8A and FIG. 8B are conceptional diagrams for adjusting an object included in a downmix signal by applying preset information in accordance with preset attribute information according to a further embodiment of the present invention.
Figure 8B:
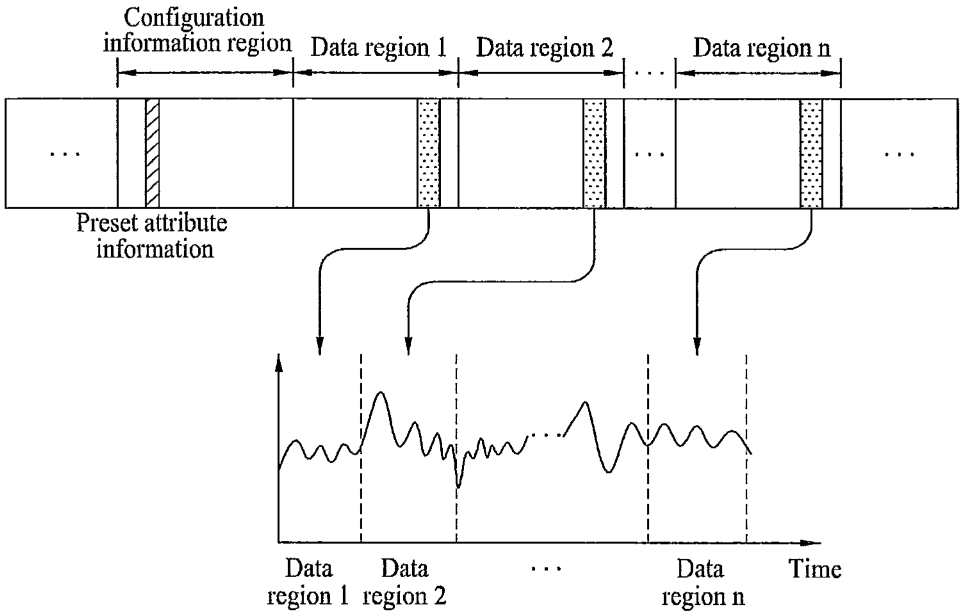

FIG. 8A and FIG. 8B are conceptional diagrams for adjusting an object included in a downmix signal by applying preset information according to preset attribute information according to a further embodiment of the present invention. An audio signal of the present invention is encoded into a downmix signal and object information in an encoder. The downmix signal and the object information are transmitted as one bitstream or separate bitstreams to a decoder.

Referring to FIG. 8A and FIG. 8B, object information included in a bitstream particularly includes a configuration information region and a plurality of data regions (data region 1, data region 2, . . . , data region n). The configuration information region is a region located at a head part of a bitstream of object information and includes information applied to all data regions of the object information in common.

For instance, the configuration information region can contain configuration information including a tree structure and the like, data region length information, object number information and the like.

On the contrary, the data region is a unit generated from dividing a time domain of a whole audio signal based on the data region length information contained in the configuration information region and is able to include a data region. The data region of the object information corresponds to a data region of the downmix signal and contains object data information as object level information and object gain information and the like based on the attribute of the object of the corresponding data region.

In an audio signal processing method according to one embodiment of the present invention, preset attribute information (preset_attribute_information) is first read from object information of a bitstream. The preset attribute information indicates that preset information is included in which region of a bitstream. Preferable, the preset attribute information indicates whether preset information is included in a configuration information region of the object information or a data region of the object information and its detailed meanings are shown in Table 2.

TABLE 2

| Preset attribute information (preset_attribute_information) | meaning |
|---|---|
| 0 | Preset information is included in a configuration information region. |
| 1 | Preset information is included in a data region. |

Referring to FIG. 8A, if preset attribute information is set to 0 to indicate that preset information is included in a configuration information region, rendering is performed in a manner that preset information extracted from the configuration information region is equally applied to all data regions of a downmix signal.

Referring to FIG. 8B, if preset attribute information is set to 1 to indicate that preset information is included in a data region, rendering is performed in a manner that preset information extracted from the data region is equally applied to a corresponding data region of a downmix signal. For instance, preset information extracted from a data region 1 is applied to a downmix signal of the data region 1. And, preset information extracted from a data region n is applied to a downmix signal of the data region n.

Moreover, the preset attribute information may indicate whether the preset information is static or dynamic. If preset attribute information set to 0 indicates that preset information is included in a configuration information region, it is able to call that the preset information is static. In this case, the preset information is statically and equally applied to all data regions.

On the contrary, if preset attribute information set to 1 indicates that preset information is included in a data region, it is able to call that the preset information is dynamic. In this case, since the preset information is applied to a corresponding data region only to render a downmix signal of the corresponding data region, the preset information is dynamically applied per data region. In this case, if the preset information is dynamic, it is preferable that the preset information exists in an extension region of the data region. If the preset information is static, it is preferable that the preset information exists in an extension region of the configuration information region.

Therefore, an audio signal processing method according to one embodiment of the present invention is able to render (or upmix) a downmix signal in a manner of using preset information suitable for each data region according to a characteristic of a sound source by preset attribute information or applying the same preset information to all data regions, based on preset attribute information.

Figure 9:
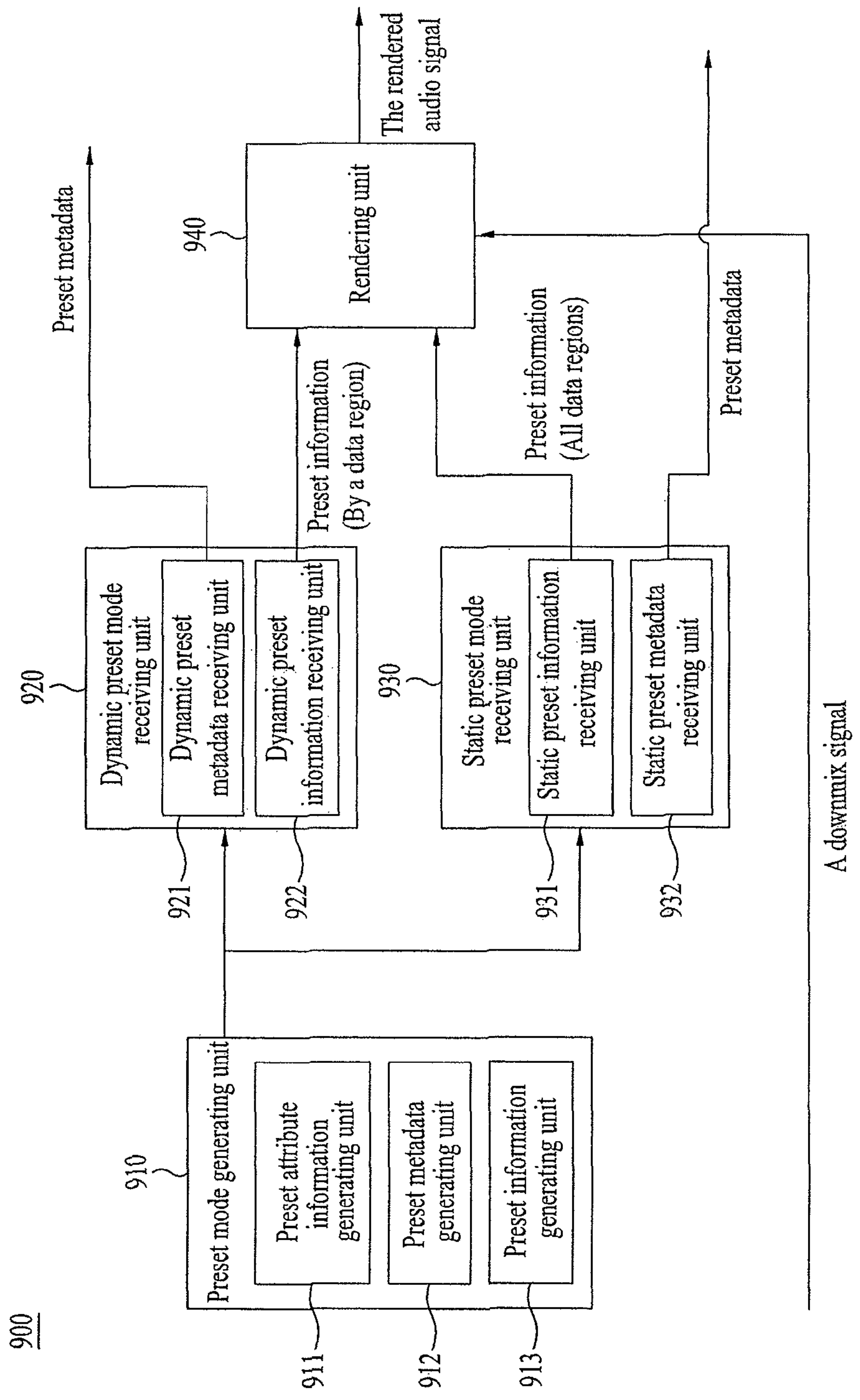
FIG. 9 is a block diagram of an audio signal processing apparatus according to a further embodiment of the present invention.

FIG. 9 is a block diagram of an audio signal processing apparatus 900 according to a further embodiment of the present invention.

Referring to FIG. 9, an audio signal processing apparatus 900 can include a preset mode generating unit 910, an information receiving unit (not shown in the drawing), a dynamic preset mode receiving unit 920, a static preset mode receiving unit 930 and a rendering unit 940.

The preset mode generating unit 910 generates a preset mode for adjustment in rendering an object included in an audio signal and is able to include a preset attribute determining unit 911, a preset metadata generating unit 912 and a preset information generating unit 913.

As mentioned in the foregoing description, the preset attribute determining unit 911 determines preset attribute information indicating whether preset information is applied to all data regions by being included in a configuration information region or per data region by being included in a data region.

Subsequently, the preset metadata generating unit 912 and the preset information generating unit 913 are able to generate one preset metadata and preset information or a plurality of preset metadata and preset information amounting to the number of data regions.

The preset metadata generating unit 912 is able to generate preset metadata by receiving an input of text information representing the preset information. On the contrary, if a gain for adjusting a level of the object and/or a position of the object is inputted to the preset information generating unit 913, the preset information generating unit 913 is able to generate preset information that will be applied to the object.

The preset information can be generated to be applicable to each object. The preset information can be implemented in various types. For instance, the present information can be implemented into a channel level difference (CLD) parameter, a matrix or the like.

The preset information generating unit 913 is able to further generate output channel information indicating the number of output channels of the object.

The preset metadata generated by the preset metadata generating unit 912 and the preset information, the output channel information and the like generated by the preset information generating unit 913 can be transferred in a manner of being included in one bitstream. In particular, they can be transferred in a manner of being included in an ancillary region of a bitstream that includes a downmix signal.

Meanwhile, the preset mode generating unit 912 is able to further generate preset presence information indicating that the preset information and the output channel information are included in the bitstream. In this case, the preset presence information can be represented in a container type indicating the preset information or the like is included in which region of the bitstream. Alternatively, the preset presence information can be represented in a flag type that simply indicates whether the preset information or the like is included in the bitstream instead of indicating a prescribed region. And, the preset presence information can be further implemented in various types.

The preset mode generating unit 912 is able to generate a plurality of preset modes. Each of the preset modes includes the preset information, the preset metadata and the output channel information. In this case, the preset mode generating unit 912 is able to further generate preset number information indicating the number of the preset modes.

Thus, the preset mode generating unit 910 is able to generate and output preset attribute information, preset metadata and preset information in a format of bitstream.

The bitstream, as shown in FIG. 8A or FIG. 8B, is inputted to the information receiving unit (not shown in the drawing). The preset attribute information is obtained from the bitstream inputted to the information receiving unit (not shown in the drawing). It is then determined that the preset information is included in which region of the transferred bitstream.

The dynamic preset mode receiving unit 920 is activated if the preset information is included in the data region ('preset_attribute_flag=1' shown in Table 2) based on the preset attribute information outputted from the preset attribute determining unit 911.

And, the dynamic preset mode receiving unit 920 can include a dynamic preset metadata receiving unit 921 receiving preset metadata corresponding to a corresponding region and a dynamic preset information receiving unit 922 receiving per-data region preset information. The dynamic preset metadata receiving unit 921 receives selected preset metadata and then outputs the received metadata. The dynamic preset information receiving unit 922 receives the preset information. And, relevant details will be explained in detail with reference to FIG. 10A and FIG. 10B later.

The static preset mode receiving unit 930 is activated if the preset information is included in the configuration information region ('preset_attribute_flag=0' shown in Table 2) based on the preset attribute information.

And, the static preset mode receiving unit 930 can include a static preset information receiving unit 931 receiving preset information corresponding to all data regions and a static preset metadata receiving unit 932 receiving preset metadata.

Although the static preset information receiving unit 931 and the static preset metadata receiving unit 932 of the static preset mode receiving unit 930 have the same configurations and functions of the dynamic preset information receiving unit 922 and the dynamic preset metadata receiving unit 921 of the dynamic preset mode receiving unit 920, they differ from each other in a range of a downmix signal corresponding to the received and outputted preset information and metadata.

The rendering unit 940 receives an input of a downmix signal generated from downmixing an audio signal including a plurality of objects and an input of the preset information outputted from the dynamic preset information receiving unit 922 or an input of the preset information outputted from the static preset information receiving unit 931. In this case, the preset information is used to adjust a level or position of the object by being applied to the object included in the downmix signal.

In case that the audio signal processing apparatus 900 includes a display unit (not shown in the drawing), the selected preset metadata outputted from the dynamic preset metadata receiving unit 921 or the selected preset metadata outputted from the static preset metadata receiving unit 931 can be displayed on a screen of the display unit.

Figure 10A:
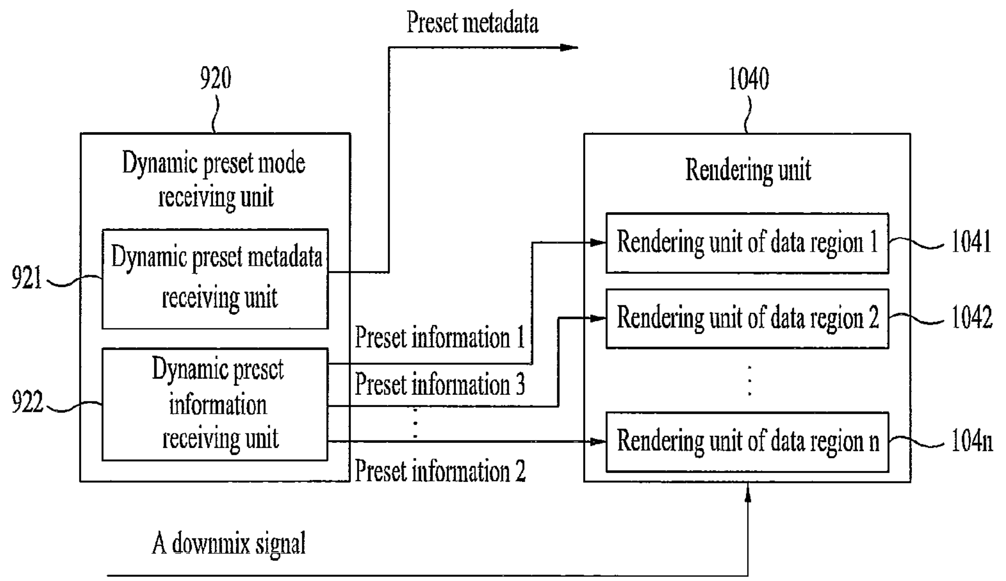
FIG. 10A and FIG. 10B are block diagrams for a method of applying preset information to a rendering unit according to a further embodiment of the present invention, respectively.
Figure 10B:
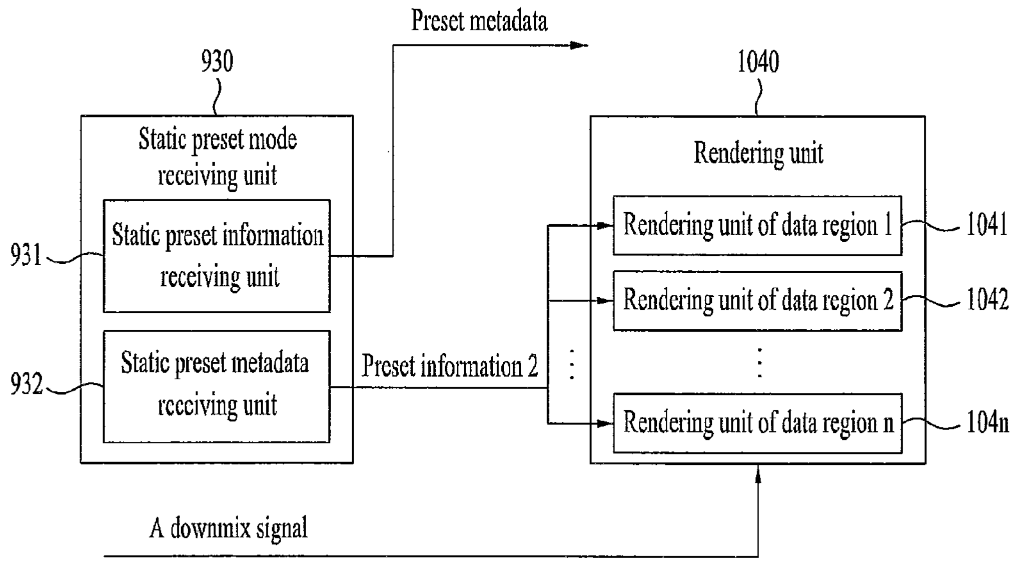

FIG. 10A and FIG. 10B are block diagrams for a method of applying preset information to a rendering unit according to an embodiment of the present invention.

FIG. 10A shows a method of applying preset information outputted from a dynamic preset mode receiving unit 920 in a rendering unit 1040. The dynamic preset mode receiving unit 920 shown in FIG. 10A is equal to the former dynamic preset mode receiving unit 920 shown in FIG. 3 and includes a dynamic preset metadata receiving unit 921 and a dynamic preset information receiving unit 922.

The dynamic preset mode receiving unit 920 receives and outputs preset metadata and preset information per a data region. The preset information is then inputted to the rendering unit 1040.

The rendering unit 1040 performs rendering per a data region by receiving a downmix signal as well as the preset information. And, the rendering unit 1040 includes a rendering unit of data region 1 1041, a rendering unit of data region 2 1042, . . . , a rendering unit of data region n. In this case, each rendering unit of data region 104X of the rendering unit 1040 performs rendering in a manner of receiving an input of the preset information corresponding to each data region and then applying the input to the downmix signal.

For instance, preset information_1, which is a stadium mode, is applied to a data region 1. Preset information_3, which is a karaoke mode, is applied to a data region 2. And, preset information_2, which is a news mode, is applied to a data region 6. In this case, 'n' in preset information_n indicates an index of a data region mode. Meanwhile, it is understood that preset metadata is outputted per a data region as well.

FIG. 10B shows a method of applying preset information outputted from a static preset mode receiving unit 930 in a rendering unit 1040. The static preset mode receiving unit 930 shown in FIG. 10B is equal to the former static preset mode receiving unit 930 shown in FIG. 9.

The static preset mode receiving unit 930 receives and outputs preset metadata and preset information corresponding to all data regions. The preset information is then inputted to the rendering unit 1040.

The rendering unit 1040 shown in FIG. 10B includes a plurality of rendering unit of data region 104X amounting to the number of data regions like the former rendering unit shown in FIG. 10A. In case of receiving the preset information from the static preset mode receiving unit 930, the rendering unit 1040 performs rendering in a manner that the all rendering units of data region 104X equally apply the received preset information to the downmix signal.

For instance, if the preset information outputted from the static preset information receiving unit 932 is preset information 2 indicating a news mode, the news mode is applicable to all rendering units of data region including first to $n^{th}$ data regions.

Figure 11:
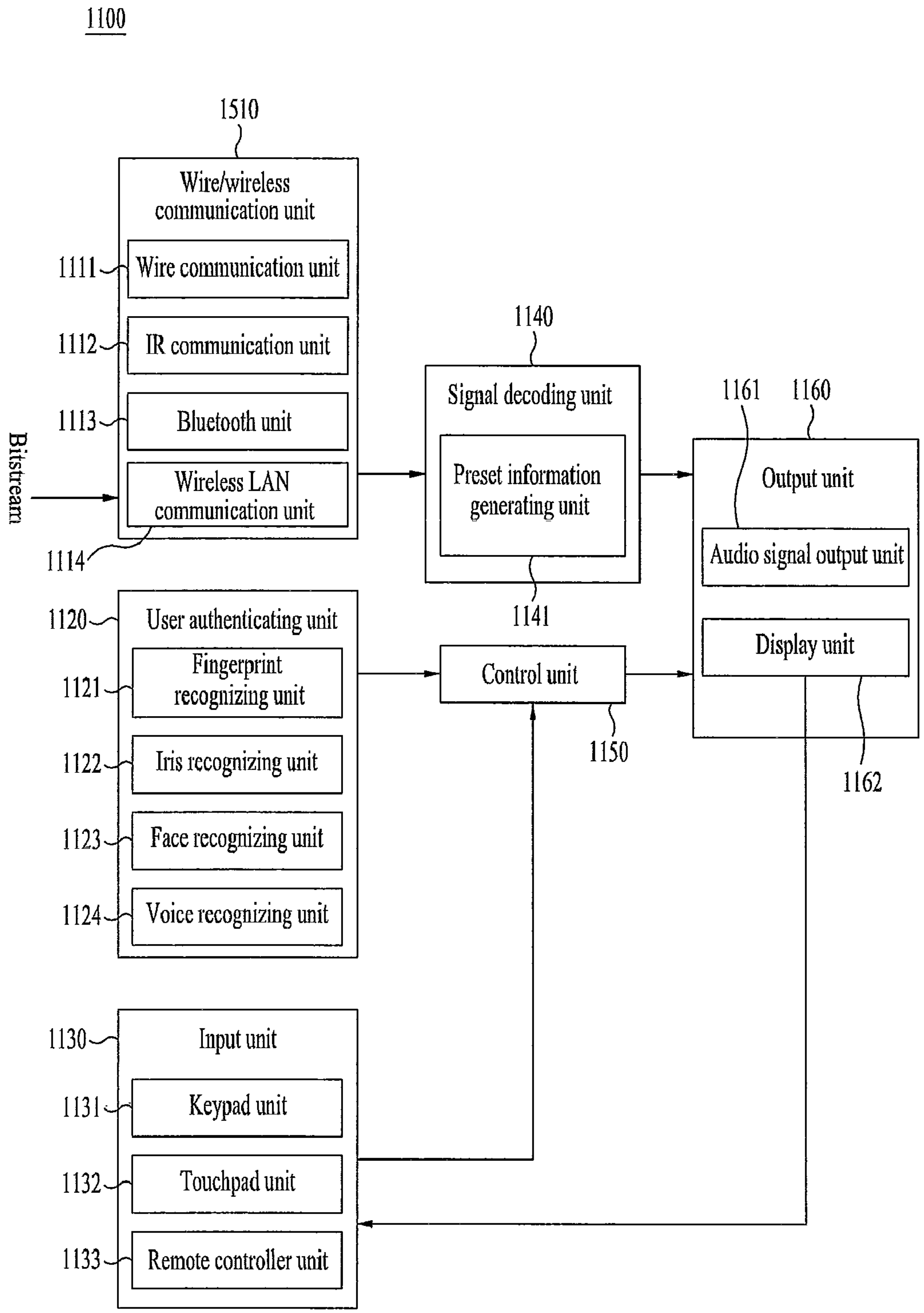
FIG. 11 is a schematic diagram of a product including a preset information generating unit according to a further embodiment of the present invention.
Figure 12A:
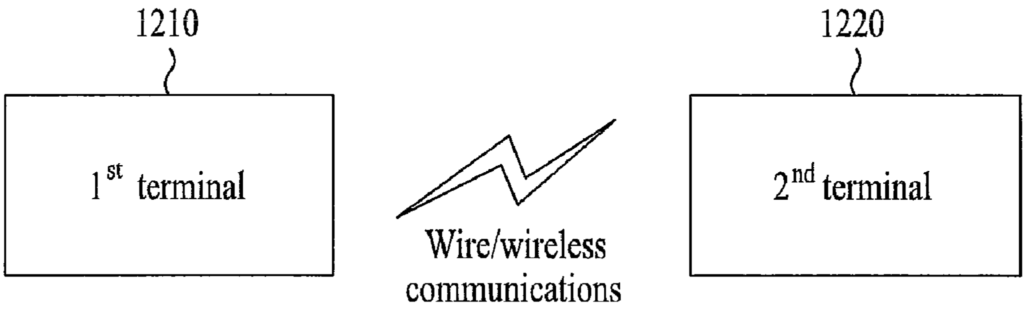
FIG. 12A and FIG. 12B are schematic diagrams for relations of products including a preset information generating unit according to a further embodiment of the present invention, respectively.
Figure 12B:
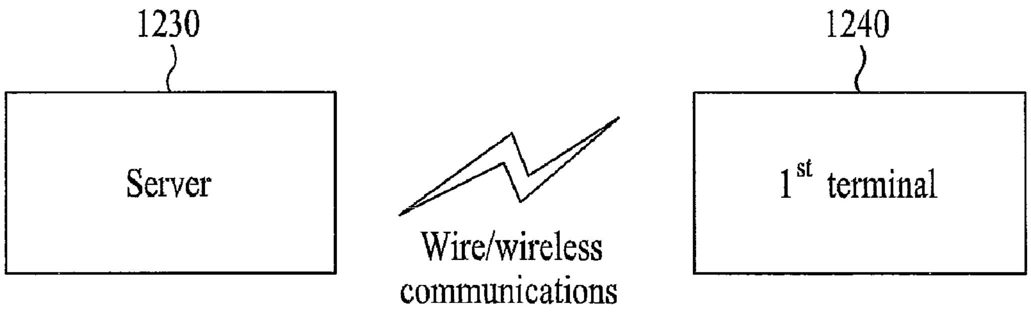

FIG. 11 is a schematic diagram of a product (1100) including a preset information generating unit according to a further embodiment of the present invention, and FIG. 12A and FIG. 12B are schematic diagrams for relations of products including a preset information generating unit according to a further embodiment of the present invention, respectively.

Referring to FIG. 11, a wire/wireless communication unit 1510 receives a bitstream by wire/wireless communications. In particular, the wire/wireless communication unit 1510 includes at least one of a wire communication unit 1111, an infrared communication unit 1112, a Bluetooth unit 1113 and a wireless LAN communication unit 1114.

A user authenticating unit 1120 receives an input of user information and then performs user authentication. The user authenticating unit 1120 can include at least one of a fingerprint recognizing unit 1121, an iris recognizing unit 1122, a face recognizing unit 1123 and a voice recognizing unit 1124. In this case, the user authentication can be performed in a manner of receiving an input of fingerprint information, iris information, face contour information or voice information, converting the inputted information to user information, and then determining whether the user information matches registered user data.

An input unit 1130 is an input device enabling a user to input various kinds of commands. And, the input unit 1130 can include at least one of a keypad unit 1131, a touchpad unit 1132 and a remote controller unit 1133, by which examples of the input unit 1130 are non-limited. Meanwhile, if preset metadata corresponding to the preset information generating unit 1141 is generated, when the preset metadata is displayed on a screen of the display unit 1162, a user is able to select the preset metadata via the input unit 1130 and information on the selected preset metadata is inputted to a control unit 1150.

A signal decoding unit 1140 includes a preset information generating unit 1141. If it is determined that the preset information is not included based on the preset flag included in the received bitstream based on data type information, the preset information generating unit 1141 generates initial preset information based on at least one of an object gain and an object gain ratio. If it is determined that the preset information is included in the received bitstream, the preset information generating unit 1141 does not generate preset information but extracts preset information from the bitstream. In this case, the preset information is obtained based on preset presence information indicating whether preset information exists, preset number information indicating the number of preset information and output channel information based on the number of output channels, e.g., a case that an output channel is one of a mono channel, a stereo channel and a multi-channel. If preset information is represented as a matrix, output channel information is received and a preset information is then received based on the output channel information.

The signal decoding unit 1140 generates an output signal by decoding an audio signal using the received bitstream, preset metadata and initial preset information and outputs the preset metadata of a text type.

A control unit 1150 receives input signals from the input devices and controls all processes of the signal decoding unit 1140 and an output unit 1160. As mentioned in the foregoing description, information on selected preset metadata is inputted as an input signal type to the control unit 1150 from the input unit 1130. If data type information indicating preset information is not included in a bitstream is inputted from the wire/wireless communication unit 1110, initial preset information is generated using at least one of an object gain and an object gain ratio and an audio signal is then decoded using the generated initial preset information.

And, an output unit 1160 is an element for outputting an output signal and the like generated by the signal decoding unit 1140. The output unit 1160 can include a speaker unit 1161 and a display unit 1162. If an output signal is an audio signal, it is outputted via the speaker unit 1161. If an output signal is a video signal, it is outputted via the display unit 1162. Moreover, the output unit 1160 displays the preset metadata selected by the control unit 1150 on a screen via the display unit 1162.

FIG. 12A and FIG. 12B show the relations between a terminal and a server corresponding to the product shown in FIG. 11.

Referring to FIG. 12A, it can be observed that bidirectional communications of data or bitstreams can be performed between a first terminal 1210 and a second terminal 1220 via wire/wireless communication units. The data or the bitstream exchanged via the wire/wireless communication unit may include the bitstream generated in FIG. 1, the bitstream shown in FIG. 8A or FIG. 8B, or the data including preset attribute information, preset information or initial preset information, preset metadata, data type information and the like described with reference to FIGS. 1 to 11 of the present invention. Moreover, the data or the bitstream exchanged via the wire/wireless communication unit may include a bitstream containing data type information only.

Referring to FIG. 12B, it can be observed that wire/wireless communications can be performed between a server 1230 and a first terminal 1240.

Figure 13:
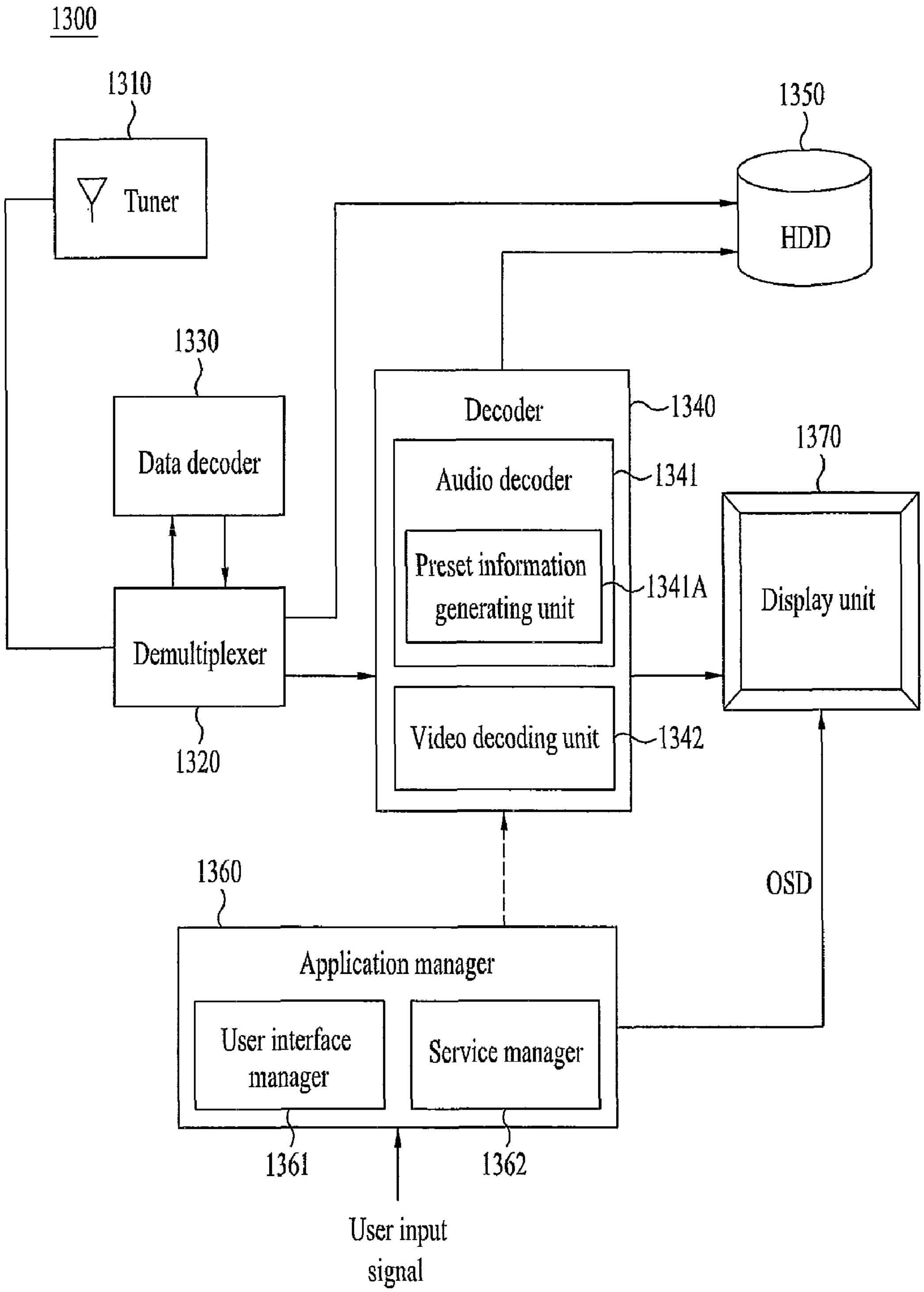
FIG. 13 is a schematic block diagram of a broadcast signal decoding apparatus including a preset information generating unit according to a further embodiment of the present invention.

FIG. 13 is a schematic block diagram of a broadcast signal decoding apparatus 1300, in which a preset information generating unit according to one embodiment of the present invention is implemented.

Referring to FIG. 13, a demultiplexer 1320 receives a plurality of data related to a TV broadcast from a tuner 1310. The received data are separated by the demultiplexer 1320 and are then decoded by a data decoder 1330. Meanwhile, the data separated by the demultiplexer 1320 can be stored in such a storage medium 1350 as an HDD.

The data separated by the demultiplexer 1320 are inputted to a decoder 1340 including an audio decoder 1341 and a video decoder 1342 to be decoded into an audio signal and a video signal. The audio decoder 1341 includes a preset information generating unit 1341A according to one embodiment of the present invention. If it is determined that preset information is not included based on a preset flag included in a received bitstream, the preset information generating unit 1341A generates preset information using an object gain and an object gain ratio.

If preset information is included in a received bitstream, the preset information generating unit 1341A does not generate a separate preset but extracts preset information from the bitstream. In this case, the preset information is obtained based on preset presence information indicating whether preset information is present, preset number information indicating the number of preset informations and output channel information indicating that an output channel is one of a mono channel, a stereo channel and a multi-channel. If preset information is represented as a matrix, output channel information is received and a preset matrix is then received based on the received output channel information. The audio decoder 1341 generates an output signal by decoding an audio signal using the received bitstream, preset metadata and preset information and outputs the preset metadata of a text type.

A display unit 1370 visualizes or displays the video signal outputted from the video decoder 1342 and the preset metadata outputted from the audio decoder 1341. The display unit 1370 includes a speaker unit (not shown in the drawing). And, an audio signal, in which a level of an object outputted from the audio decoder 1341 is adjusted using the preset information, is outputted via the speaker unit included in the display unit 1370. Moreover, the data decoded by the decoder 1340 can be stored in the storage medium 1350 such as the HDD.

Meanwhile, the signal decoding apparatus 1300 can further include an application manager 1360 capable of controlling a plurality of data received by having information inputted from a user.

The application manager 1360 includes a user interface manager 1361 and a service manager 1362. The user interface manager 1361 controls an interface for receiving an input of information from a user. For instance, the user interface manager 1361 is able to control a font type of text visualized on the display unit 1370, a screen brightness, a menu configuration and the like. Meanwhile, if a broadcast signal is decoded and outputted by the decoder 1340 and the display unit 1370, the service manager 1362 is able to control a received broadcast signal using information inputted by a user. For instance, the service manager 1362 is able to provide a broadcast channel setting, an alarm function setting, an adult authentication function, etc. The data outputted from the application manager 1360 are usable by being transferred to the display unit 1370 as well as the decoder 1340.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Accordingly, the present invention provides the following effects or advantages.

First of all, in case that preset information, which was predetermined, is received, a level of an output channel of an object can be easily adjusted in a manner of selecting one of a plurality of the preset informations using a plurality of metadata without user's settings of objects.

Secondly, even if preset information is not received, it is able to reconstruct an audio signal by generating initial preset information using received object information.

Thirdly, it is able to adjust a gain and/or panning of an object included in a downmix signal using preset information generated by a decoder side according to a characteristic of a sound source and a user's purpose of use.

Fourthly, since preset information is extracted separate from a sound source and is then stored, it is able to extract and use the preset information only irrespective of the sound source. Therefore, it is able to effectively use the preset information in a separate playback device by avoiding infringement of copyright for the sound source.

Fifthly, it is able to efficiently reconstruct an audio signal in a manner of individually selecting to apply preset information by a data region unit according to a characteristic of a sound source or selecting to apply the same preset information for a whole downmix signal.

The invention claimed is:

1. A method of processing an audio signal, comprising:

receiving data type information, object information and a downmix signal, the downmix signal generated by downmixing at least one object, the data type information indicating a type of data being included in an extension region of the object information, the object information comprising: at least one of object gain indicating gain applied to the object in the downmix signal and object gain ratio indicating a gain difference of the object between at least two channels of the downmix signal;

generating initial preset information to render the object by using at least one of the object gain and the object gain ratio; and rendering the object in the downmix signal by using the initial preset information.

2. The method of claim 1, if the downmix signal is mono signal, wherein the initial preset information is generated by using the object gain.

3. The method of claim 1, if the downmix signal is stereo signal, wherein the initial preset information is generated by using the object gain and the object gain ratio.

4. The method of claim 3, further comprising:

determining whether preset information to render the object is included in the extension region of the object information, based on the data type information.

5. The method of claim 1, wherein the initial preset information is generated in each data region of the object information.

6. The method of claim 1, wherein the rendering the object further uses the object gain and the object gain ratio.

7. An apparatus of processing an audio signal, comprising:

a receiving unit receiving data type information, object information and a downmix signal, the downmix signal generated by downmixing at least one object, the data type information indicating a type of data being included in an extension region of the object information, the object information comprising:

at least one of object gain indicating gain applied to the object in the downmix signal and object gain ratio indicating a gain difference of the object between at least two channels of the downmix signal;

an initial preset information generating unit generating initial preset information to render the object by using at least one of the object gain and the object gain ratio; and a rendering unit rendering the object in the downmix signal by using the initial preset information.

8. The apparatus of claim 7, wherein the initial preset information generating unit comprises mono initial preset information generating unit and stereo initial preset information according to a number of channels of the downmix signal.

9. The apparatus of claim 8, wherein the mono initial preset information generating unit generates the initial preset information by using the object gain.

10. The apparatus of claim 8, wherein the stereo initial preset information generating unit generates the initial preset information by using the object gain and the object gain ratio.

11. The apparatus of claim 8, wherein the stereo initial preset information generating unit comprises a gain adjustment mode generating unit generating first initial preset information adjusting gain of the object and a stereo adjustment mode generating unit generating second initial preset information adjusting gain and panning of the object.

12. The apparatus of claim 7, wherein the initial preset information is generated in each data region of the object information.

13. The apparatus of claim 7, further comprising:

a downmix processing information generating unit generating downmix processing information to control the downmix signal by using the object gain and the object gain ratio; and a downmix signal processing unit controlling panning of the object by using the downmix processing information.

14. The apparatus of claim 7, further comprising:

a preset information determining unit determining whether preset information to render the object is included in the extension region of the object information, based on the data type information.

* * * * *